(No Model.)

B. F. ORTMAN & L. G. GILBERT.
GREASE CUP.

No. 278,172. Patented May 22, 1883.

Witnesses.
Theo. L. Popp
Edw. J. Brady

B. F. Ortman
L. G. Gilbert, Inventors.
By Wilhelm & Bonner,
Attorneys.

UNITED STATES PATENT OFFICE.

BARNIM F. ORTMAN AND LEANDER G. GILBERT, OF BUFFALO, NEW YORK.

GREASE-CUP.

SPECIFICATION forming part of Letters Patent No. 278,172, dated May 22, 1883.

Application filed March 27, 1883. (No model.)

*To all whom it may concern:*

Be it known that we, BARNIM F. ORTMAN and LEANDER G. GILBERT, both of the city of Buffalo, in the county of Erie and State of New York, have invented a new and useful Improvement in Grease-Cups, of which the following is a specification.

This invention relates to an improvement in that class of lubricators in which a solid lubricant—such, for instance, as grease—is employed.

Heretofore such lubricating devices have been provided with a bar or rod, which is fitted loosely in the discharge-tube of the cup, and which rests upon the journal or other part to be lubricated and serves to conduct the heat from such part to the lubricant in the cup, which is thereby melted, and which also serves to conduct the melted lubricant to the parts to be lubricated. In lubricating devices of this class the grease melts within a certain zone around the conducting bar or tube, and when the lubricant has receded from the conducting bar or tube to the distance at which it ceases to be melted the lubrication stops and the lubricant has to be compacted against the discharge tube or bar before the lubrication will be resumed. When the lubricator is attached to rapidly-moving parts—such, for instance, as the crank-pins or cross-heads of steam-engines—it becomes necessary to stop the engine in order to compact the lubricant in the cup.

The object of our invention is to overcome this difficulty and construct the device in such manner that the lubricant will be automatically kept in contact with the discharge device, thereby insuring a continuous flow of lubricating material to the parts to be lubricated.

Our invention consists, to that end, of the improvements in the construction of the lubricator which will be hereinafter fully described, and pointed out in the claims.

Figure 1:
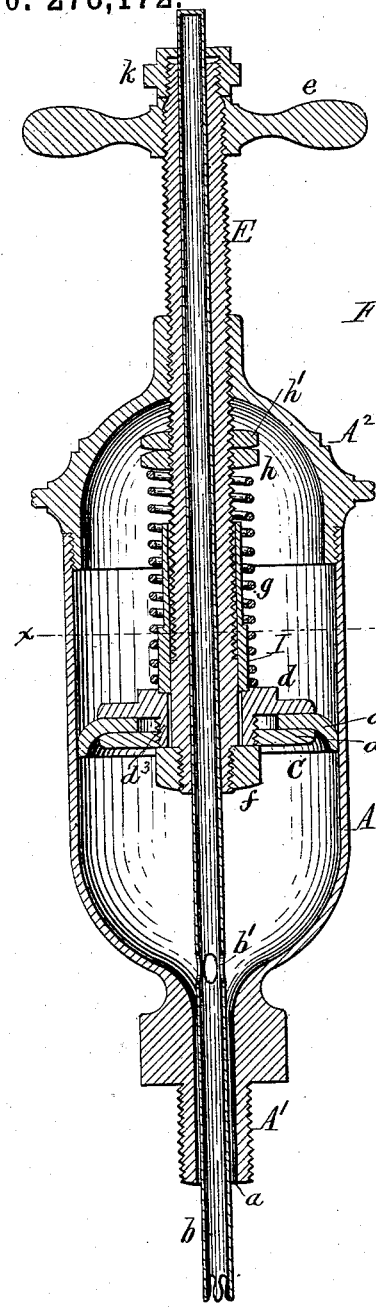
Figure 2:
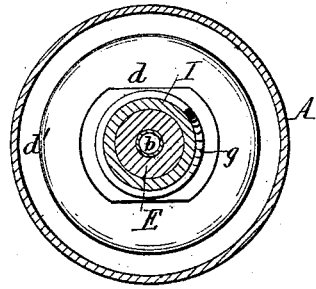

In the accompanying drawings, Figure 1 is a vertical section of our improved lubricator. Fig. 2 is a horizontal section in line $x\,x$, Fig. 1.

Like letters of reference refer to like parts in both figures.

A represents the cup or receptacle which receives the lubricating material, and which is provided at its lower end with a tubular threaded extension, A', whereby it is secured to a suitable support; and $A^2$ is the cover or top portion of the cup.

$b$ represents the discharge tube or rod, which is arranged loosely in the discharge-opening $a$ in the bottom of the cup, and which rests upon the journal or other part to be lubricated.

$b'$ represents an opening or openings formed in the tube $b$ near the bottom of the cup A, so as to conduct the lubricating material from the cup into the tube.

C represents a piston, which is arranged in the cup A around the tube or rod $b$. The piston C is composed of a body or disk, $d$, a cup-shaped packing-ring, $d'$, and a washer, $d^2$, which serves to clamp the packing-ring $d'$ against the under side of the disk $d$, the washer being secured in place by means of a screw-threaded hub, $d^3$, formed on the disk $d$, with which the washer engages.

E represents a sleeve or hollow stem, which passes loosely through the piston C, and is provided on its outer side with a screw-thread, which engages in an internal screw-thread formed in the cover $A^2$. The upper end of the stem E is provided with a hand-wheel, $e$, whereby the stem can be turned.

$f$ represents a screw-nut secured to the lower end of the stem E below the piston C, and which serves as a stop on which the piston rests when in its lowest position.

$g$ represents a spiral or other suitable spring, which bears against the upper side of the piston and tends to hold the same in contact with the stop or screw-nut $f$. As shown in the drawings, the spring $g$ surrounds the stem E and bears with its upper end against a screw-nut, $h$, which is applied to the stem E, and which can be adjusted thereon for regulating the tension of the spring. The screw-nut $h$ is secured in place by a jam-nut, $h'$.

I represents a sleeve, which is arranged between the spring $g$ and the threaded stem E, and which prevents the spring from coming in contact with the screw-thread.

As represented in the drawings, the tube $b$ extends entirely through the stem E; but when a short tube is sufficient the lower portion of the stem E only is provided with a bore for the reception of the tube. The upper end of the stem E is provided with a stuffing-box, $k$.

When the cup is filled with lubricating material, the piston is in its highest position and the spring g is compressed. As the lubricating material immediately surrounding the tube b becomes liquefied and passes off, the pressure of the spring forces the piston down and keeps the lubricating material compacted against the central tube, thereby keeping the lubricating material at all times in contact with the central tube and insuring a continuous flow of lubricating material through the tube to the parts to be lubricated. When the spring g has become fully extended and the lubricating material in the cup is not exhausted, the spring can be further compressed by turning the stem E so as to lower the stop or nut f and the nuts h h'. The piston rests during this adjustment of the stem upon the lubricating material which is still contained in the cup, and when the spring has been fully compressed the reaction of the spring will continue to force the piston down into the cup until the piston has reached the lowest possible position therein, when the tube and the piston are removed and the cup is refilled.

In our improved lubricator the piston is constantly pressing upon the lubricating material, and the lubricator will therefore supply lubricating material to the parts to be lubricated for a long time without requiring any attention on the part of the operator, thereby adapting the device more particularly for use in connection with machine parts which run with high velocity for a long time without interruption.

A fluted or longitudinally-grooved rod may be substituted for the tube b; but we prefer to employ a tube, as it is more efficient.

We claim as our invention—

1. The combination, with a grease-cup, of a central discharge tube or rod extending into the cup, a piston arranged in the cup around the discharge tube or rod, and mechanism whereby the piston is moved toward the discharge-opening of the cup and the grease compacted against the discharge tube or rod, substantially as set forth.

2. The combination, with a grease-cup, of a piston and a spring whereby the piston is forced toward the discharge-opening of the cup and the lubricating material automatically and gradually expelled from the cup, substantially as set forth.

3. The combination, with a grease-cup, of a discharge tube or rod extending into the cup, a piston arranged in the cup around the discharge tube or rod, and a screw whereby the piston is moved toward the discharge-orifice of the cup, substantially as set forth.

4. The combination, with a grease-cup, of a discharge tube or rod extending into the cup, a piston arranged in the cup around the discharge tube or rod, a spring whereby the piston is automatically moved toward the discharge-opening of the cup, and an adjusting device whereby the position of the spring can be regulated, substantially as set forth.

5. The combination, with a grease-cup, A, of a discharge tube or rod, b, a piston, C, an adjusting-stem, E, provided with a stop, f, a spring, g, and an adjusting device, h, substantially as set forth.

BARNIM F. ORTMAN.
LEANDER G. GILBERT.

Witnesses:
JNO. J. BONNER,
CHAS. F. GEYER.